A. C. STALTER.
RIDGE PLOWING ATTACHMENT FOR HARROWS.
APPLICATION FILED AUG. 9, 1919.
1,327,119.
Patented Jan. 6, 1920.
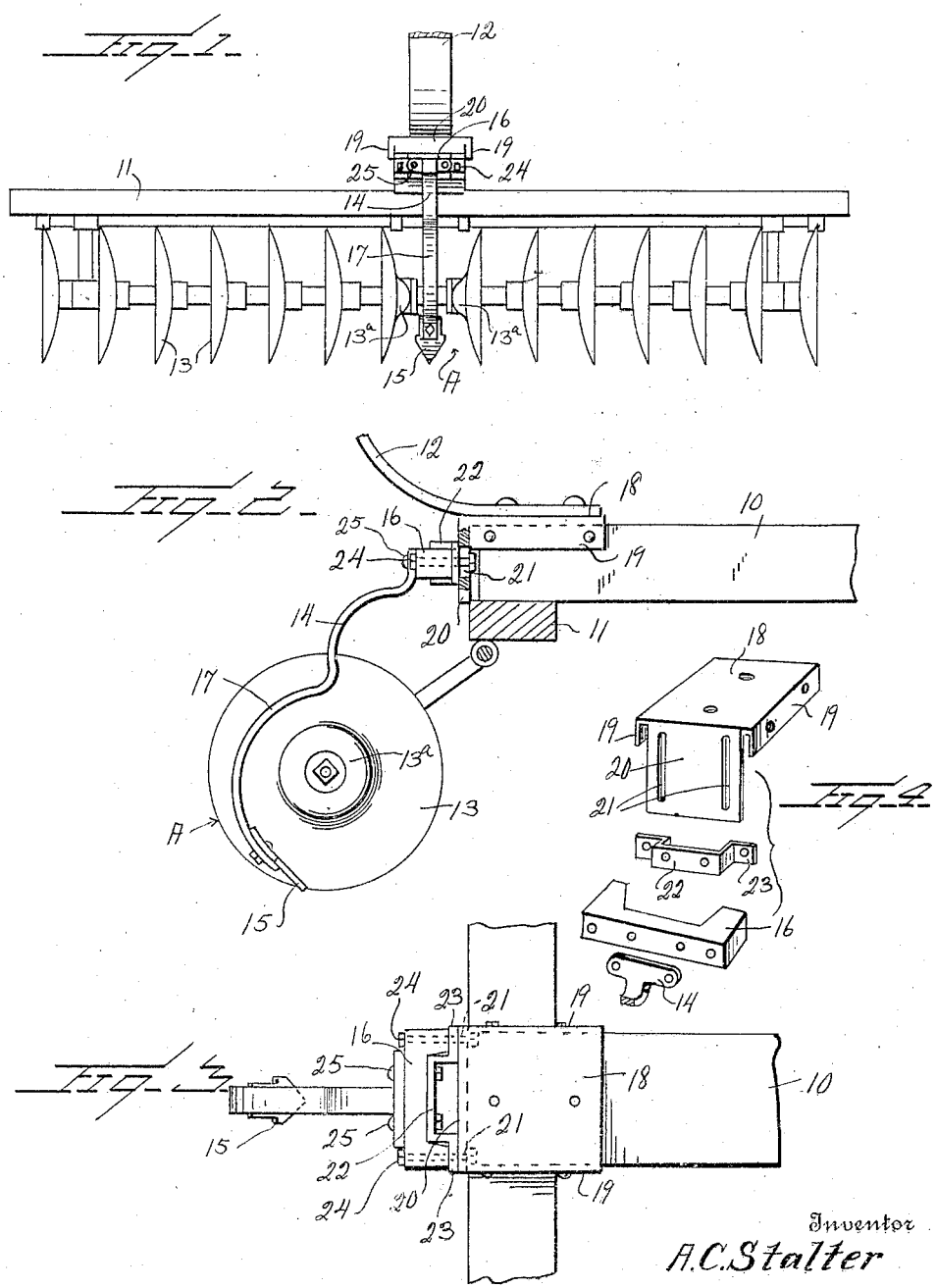

UNITED STATES PATENT OFFICE.

ANDREW C. STALTER, OF FLANAGAN, ILLINOIS.

RIDGE-PLOWING ATTACHMENT FOR HARROWS.

1,327,119. Specification of Letters Patent. Patented Jan. 6, 1920.

Application filed August 9, 1919. Serial No. 316,344.

*To all whom it may concern:*

Be it known that I, ANDREW C. STALTER, a citizen of the United States, residing at Flanagan, in the county of Livingston and State of Illinois, have invented certain new and useful Improvements in Ridge-Plowing Attachments for Harrows, of which the following is a specification, reference being had to the accompanying drawings.

This invention relates to agricultural implements, and particularly to harrows and cultivators.

In harrows having gangs of cultivator teeth or cultivator disks mounted upon a frame, there is a space at the middle of the machine between the gangs, which is unharrowed, and forms a ridge.

The object of my invention is to provide an attachment which may be used on a harrow or cultivator of this character for the purpose of cutting out this center ridge.

And a further object is to provide means whereby this attachment may be readily applied to or detachable from a cultivator or harrow of ordinary construction.

My invention is illustrated in the accompanying drawings, wherein:—

Figure 1 is a rear elevation of a harrow provided with my ridge cutter;

Fig. 2 is a vertical sectional view of the harrow shown in Fig. 1, with the ridge cutter applied thereto;

Fig. 3 is a top plan view of the construction shown in Figs. 1 and 2;

Fig. 4 is a perspective view of my attachment with the several parts of the attachment separated from each other.

Referring to these drawings, it will be seen that I have illustrated an ordinary form of disk harrow including a frame comprising a longitudinally extending tongue 10, a transverse beam 11, the upwardly extending seat supporting spring 12, and the disk harrows 13. The spring 12 is ordinarily bolted upon the upper face of the member 10 just above the cross beam 11. The disks are arranged in two gangs with a space A, as usual, between the gangs, and located at the middle of the machine. My attachment comprises a beam 14 formed of metal and carrying at its end a shovel or blade 15, and at its opposite end provided with a transversely extending head 16. This beam midway of its length is upwardly bowed, as at 17, so as to escape the bosses 13ª formed upon the confronting faces of the middle disks 13. In order to attach the beam to the harrow, I remove the spring 12 and apply upon the beam 10 the plate 18, whose ends 19 are downwardly bent so as to extend downward on each side of the beam and are bolted thereto. This plate 18 extends out beyond the end of the member 10 and is then downwardly bent, as at 20, and formed with vertical slots 21.

On this plate is attached a yoke 22 whose ends are inwardly bent toward the plate 20 and then laterally extended, as at 23, and held in place by bolts 24 passing through the slots 21. Bolts 25 pass through the cross bar 16 and through the yoke and hold the parts securely together.

It will be noted that the cross bar 16 is cut out at its middle to conform to the shape of the yoke and that the bolts 24 pass through the ends of this head 16. My attachment may be easily applied and as easily removed and it operates to cut down the ridge which is ordinarily formed between the harrow gangs. It may be attached to any form of cultivator or harrow of this character, and I have found it particularly convenient in actual practice.

I claim:—

1. The combination with a harrow having a longitudinally extending member, of an attachment comprising a beam downwardly turned at its outer end and provided with a shovel, the opposite or forward end of the beam having a transversely extending head, a plate disposed upon the longitudinal member and attached thereto and extending downward rearward of the longitudinal member, and a U-shaped yoke disposed against the downwardly extending portion of said plate and attached thereto for vertical adjustment, the head being cut out to fit this yoke and being bolted thereto, and bolts passing through the head, the yoke and said plate.

2. The combination with a harrow comprising a frame having a longitudinally extending member, a transverse member, and a seat supporting spring extending upward from the longitudinal member at its rear end, of an attachment comprising a beam bowed upward at its middle and downwardly turned at its outer end and provided with a shovel, the opposite or forward end of the beam having a transversely extending head, a plate disposed upon the longitudinal member beneath the seat spring and bolted thereto and extending downward rearward of the longitudinal member and vertically slotted, and a U-shaped yoke disposed against the downwardly extending portion of said plate, the head being cut out to fit this yoke and being bolted thereto, and bolts passing through the head, the yoke and said plate.

In testimony whereof I hereunto affix my signature in the presence of two witnesses.

ANDREW C. STALTER.

Witnesses:
NOAH EIGSTI,
EDWARD EIGSTI.